UNITED STATES PATENT OFFICE.

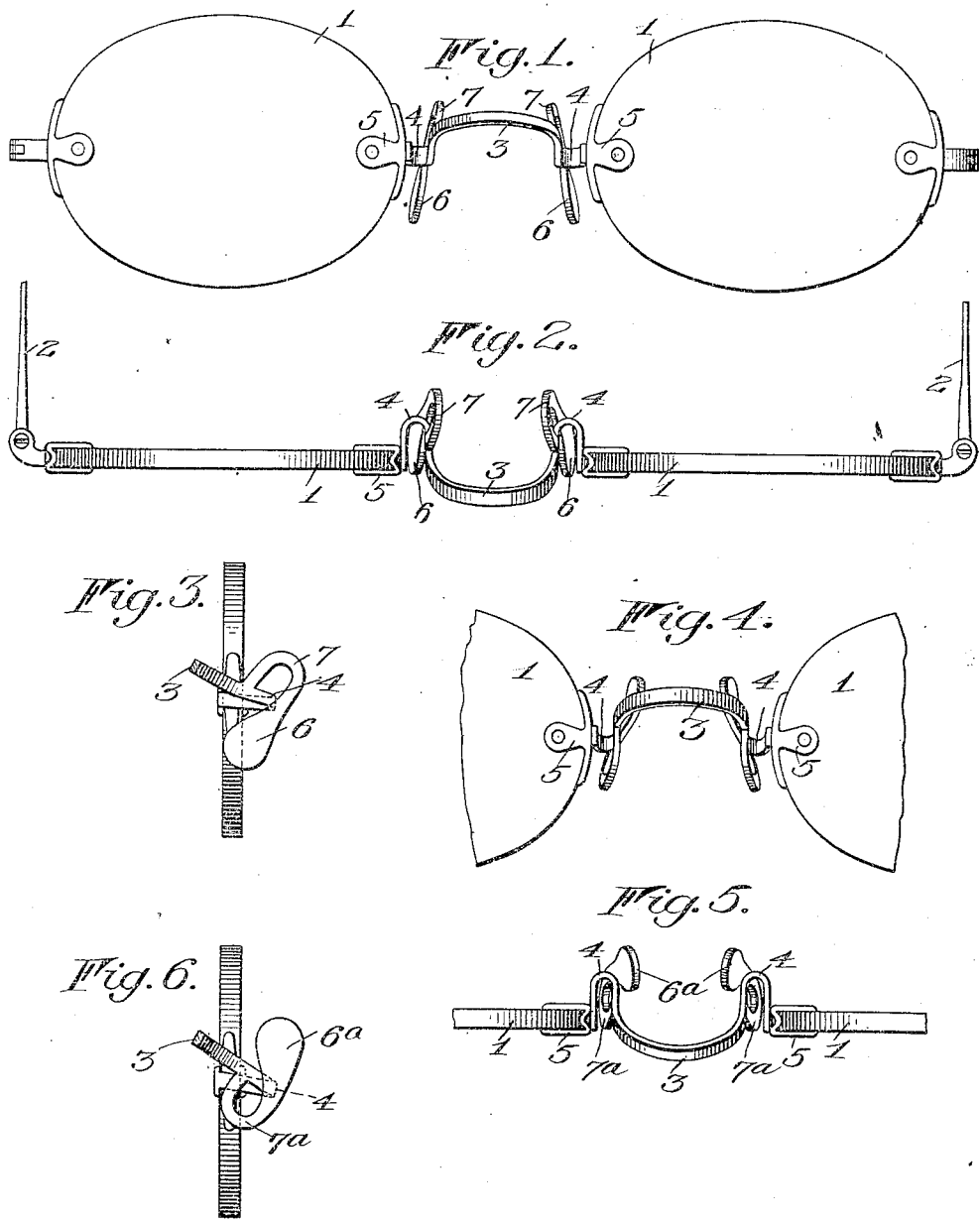

LEO F. ADT, OF ALBANY, NEW YORK.

MOUNTING FOR SPECTACLES.

1,054,076.  Specification of Letters Patent.  Patented Feb. 25, 1913.

Application filed April 29, 1910. Serial No. 558,484.

*To all whom it may concern:*

Be it known that I, LEO F. ADT, of Albany, in the county of Albany and State of New York, have invented certain new and useful Improvements in Mountings for Spectacles; and I do hereby declare the following to be a full, clear, and exact description of the same, reference being had to the accompanying drawings, forming a part of this specification, and to the reference-numerals marked thereon.

The present invention relates to mountings for spectacles of the type having the rests or supports which coöperate with the nose in such a manner as to remove the weight of the spectacles from the bridging portion in order that the portion of the nose of the wearer between the eyes will not become sore, and an object of the invention is to provide a construction in which the rests or supports will be connected to the mounting in such a manner that wide bearing surfaces on the bony part of the nose will be provided, while provision is made for the proper facing of the rests to accommodate the mounting to the facial characteristics of different persons.

To these and other ends the invention consists in certain improvements and combinations of parts, all as will be hereinafter more fully described, the novel features being pointed out in the claims at the end of the specification.

In the drawings: Figure 1 is a front view of a mounting constructed in accordance with the present improvements; Fig. 2 is a top view of the same mounting; Fig. 3 is a central vertical section through the mounting; Fig. 4 is a front view of another embodiment of the invention, and Figs. 5 and 6 are, respectively, a top and a centrally vertical section of the latter embodiment.

Referring more particularly to the drawings 1 indicates the lenses and 2 the temples, the lenses being connected by a mounting comprising in this instance a bridging portion 3 and pliable portions 4 permitting the adjustment of the lenses relatively to each other and to the bridging portion 3 for the purpose of obtaining different pupilary distances. The bridging portion 3 is preferably inclined forwardly to the plane of the lenses at such an angle that it conforms to the nose of the wearer and bears throughout its length against the nose. It may be made of very thin round stock as its contact with the nose is so slight that it is possible to employ less material, thus rendering the cost of manufacture less and reducing the conspicuousness of the mounting. The pliable portions 4 are preferably in the form of loops which in this instance open forwardly, the inner arm of each loop merging into one of the extremities of the bridging portion and the outer arm being secured to one of the lens attaching devices 5. It is preferred to make the pliable portions of flat stock with the flat faces vertically arranged so that while permitting adjustment for pupilary distances, substantial rigidity in a vertical direction is obtained.

In the embodiment of the invention, shown in Figs. 1 to 3, the mounting is provided with nose rests each comprising a pad 6 located below or on the under side of the horizontal plane of the extremities of the bridging portion so as to bear upon the bony part of the nose. To permit the facing of the pad the latter is connected with the mounting by a reduced portion which in this instance is in the form of a loop 7, preferably connecting with the mounting on the inner side of the pliable portion 4 in advance of the bend of the latter so that adjustment of the lenses for pupilary distance may be effected without affecting the relative positions of the rests. In this instance the loop or reduced portion extends upwardly from the upper side of the mounting, thence rearwardly, thence downwardly connecting with the pad 6 at the upper edge thereof, the downwardly extending portion lying on the inner side of the loop 4.

From the foregoing it will be seen that the pad 6 provides a wide flat bearing surface for coöperation with the bony part of the nose, and, as this pad is connected to the mounting by an elongated reduced portion, it has resiliency and at the same time may be adjusted forwardly and rearwardly, faced to conform with the forward upper taper of the nose and adjusted vertically.

The elongated reduced portion is also employed as a nose engaging portion, being in the form of a loop having one arm in advance of the other so that both arms may engage the nose. This loop is located on the opposite side of the horizontal plane of the extremities of the bridging portion and engages that portion of the nose between the eyes, being, of course, adjustable to conform to such portion.

In the embodiment of the invention shown in Figs. 4, 5 and 6, the bridging portion 3 and the pliable portion 4 are formed similarly to those employed in Figs. 1 to 3, inclusive. The widened or pad portion 6$^a$ of each nose rest lies above the horizontal plane of the extremities of the bridging portion, while the looped or reduced portion 7$^a$ lies below said plane, and has its rear arm connecting to the lower edge of the pad 6$^a$ and its forward arm connecting to the mounting in advance of the bend of the loop or pliable portion 4. Of course, in this construction, the upper portion of the rest has greater resiliency than the lower portion and both the latter and the pad may be adjusted to conform to the shape of the nose of the wearer.

In both embodiments of the invention, the nose rests are preferably formed from flat stock and are soldered to or made in one piece with the stock forming the bridging portion and loops 4. Both constructions are simple to manufacture and when once fitted do not lose their adjustment. There are no bearings to get out of order and the cost of manufacturing is small. The shape of the supports is such that the nose is engaged without any uncomfortableness and the weight of the mounting is removed from that portion of the nose between the eyes.

I claim as my invention:

1. In a spectacle mounting, the combination with a rigid, saddle bridge inclined to the plane of the lenses, a lens attaching device, and a pliable portion connecting the bridging portion with the lens attaching device, of a rest embodying a pad and a pliable loop having one arm supporting the pad and the other arm arranged in front of the pad supporting arm and secured to the mounting on the inner side of the pliable portion of the latter so as not to be adjusted when the pliable portion is adjusted.

2. In a spectacle mounting, the combination with a rigid, saddle bridge inclined to the plane of the lenses, a lens attaching device, and a pliable portion connecting the bridging portion and the lens attaching device, of a nose rest embodying a pad lying on one side of the horizontal plane of the extremities of the bridging portion, and a pliable portion extending from said pad to the opposite side of the horizontal plane of the extremities of the bridging portion, thence forwardly and thence toward the mounting, being secured to the latter on the inner side of the pliable portion in order that the lens attaching device may be adjusted independently of the nose rest.

3. In a spectacle mounting, the combination with a bridging portion, a lens attaching device, and a pliable portion connecting the lens attaching device with the bridging portion, of a nose rest having a pad arranged below the horizontal plane of the extremities of the bridging portion and a pliable portion extending upwardly from the upper edge of the pad, thence forwardly and thence downwardly connecting with the mounting on the inner side of the pliable portion.

4. In a spectacle mounting, the combination with a rigid bridging portion conforming to and arranged to rest throughout its length upon the nose of a wearer, a lens attaching device, and a pliable loop connecting the lens attaching device to the bridging portion, of a nose rest having a widened portion arranged to bear on the nose below the extremities of the bridging portion, and a reduced pliable portion extending upwardly above the extremities of the bridging portion, looped and connected to the mounting at a point on the inner side of the pliable loop so that the adjustment of the latter will not affect the adjustment of the rest.

5. In a spectacle mounting, the combination with a rigid bridging portion conforming to and arranged to bear on the nose of wearer throughout its length, a lens attaching device, and a pliable loop connecting the lens attaching device with the bridging portion, of a nose rest having a pad arranged to one side of the horizontal plane of the extremities of the bridging portion and a pliable loop arranged on the opposite side of said plane and having one arm connected to the pad and the other arm connected to the mounting on the inner side of the pliable loop so that the latter may be adjusted without adjusting the guard, the two loop arms lying one in front of the other so that both may engage the nose of the wearer.

6. In a spectacle mounting, the combination with a rigid bridging portion arranged to bear on the nose of a wearer throughout its length, a lens attaching device, and a pliable forwardly opening loop connecting the bridging portion with the lens attaching device, of a nose rest embodying a pliable portion extended from one side of the mounting in front of the bend of the loop and on the inner side of the bend, thence rearwardly and thence forwardly, and a pad at the free end of the pliable portion.

7. In a spectacle mounting, the combination with a rigid, saddle bridge inclined to the plane of the lenses arranged to bear on the nose of the wearer throughout its length. a lens attaching device, and a pliable forwardly opening loop, of a nose rest embodying a pliable portion extended upwardly from the mounting in front of the bend of the loop and on the inner side of the bend, thence rearwardly and thence downwardly and a pad carried by the free end of the downwardly extending portion.

LEO F. ADT.

Witnesses:
 EDWARD MURPHY, 2d,
 JAS. B. EGAN.